(12) United States Patent
Watanabe et al.

(10) Patent No.: US 9,494,208 B2
(45) Date of Patent: Nov. 15, 2016

(54) DAMPING DEVICE

(75) Inventors: Yoshihito Watanabe, Tokyo (JP); Ryoji Tomono, Tokyo (JP); Hidenori Kida, Tokyo (JP); Shigeki Nakaminami, Tokyo (JP); Hisaya Tanaka, Tokyo (JP)

(73) Assignee: THK CO., LTD., Shinagawa-ku (JP)

( * ) Notice: Subject to any disclaimer, the term of this patent is extended or adjusted under 35 U.S.C. 154(b) by 291 days.

(21) Appl. No.: 14/347,198

(22) PCT Filed: Oct. 19, 2011

(86) PCT No.: PCT/JP2011/074000
§ 371 (c)(1),
(2), (4) Date: Mar. 25, 2014

(87) PCT Pub. No.: WO2013/057797
PCT Pub. Date: Apr. 25, 2013

(65) Prior Publication Data
US 2014/0231197 A1    Aug. 21, 2014

(51) Int. Cl.
*F16F 9/12*    (2006.01)
*E04H 9/02*    (2006.01)

(52) U.S. Cl.
CPC ............... *F16F 9/12* (2013.01); *E04H 9/023* (2013.01); *F16F 2232/06* (2013.01)

(58) Field of Classification Search
CPC ........ E04H 9/02; F16F 9/103; F16F 2232/06
See application file for complete search history.

(56) References Cited

U.S. PATENT DOCUMENTS

| | | | |
|---|---|---|---|
| 5,135,083 A * | 8/1992 | Hayashi | .................... E05F 5/00 16/49 |
| 6,385,917 B1 | 5/2002 | Konomoto | |
| 6,499,573 B1 | 12/2002 | Konomoto | |
| 6,510,660 B1 | 1/2003 | Michioka et al. | |
| 2004/0084265 A1* | 5/2004 | Muller | .................. E05F 1/1058 188/294 |
| 2005/0034943 A1* | 2/2005 | Smith | .................... F16F 7/1022 188/301 |

(Continued)

FOREIGN PATENT DOCUMENTS

| | | |
|---|---|---|
| JP | 10-184757 A | 7/1998 |
| JP | 2000-274474 A | 10/2000 |

(Continued)

OTHER PUBLICATIONS

International Search Report dated Jan. 17, 2012 issued in correponding application No. PCT/JP2011/074000.

*Primary Examiner* — Bradley King
(74) *Attorney, Agent, or Firm* — Westman, Hattori, Daniels & Adrian, LLP

(57) ABSTRACT

The damping device includes: a fixed cylinder that is configured to be fixed to a first structural body and formed into a cylindrical shape so as to comprise a hollow portion; a shaft member that is configured to be fixed to a second structural body, the shaft member being housed in the hollow portion of the fixed cylinder and having an outer peripheral surface provided with a helical thread groove; a nut member that is threadedly engaged with the shaft member, and converts an axial motion of the shaft member into a rotational motion; a rotor member that is formed into a cylindrical shape so as to cover the fixed cylinder and to form a cylindrical accommodation chamber between the rotor member and an outer peripheral surface of the fixed cylinder, and is rotated by the nut member; and viscous fluid that is sealed in the cylindrical accommodation chamber.

7 Claims, 4 Drawing Sheets

(56) References Cited

U.S. PATENT DOCUMENTS

2006/0124413 A1 6/2006 Namuduri
2007/0216124 A1* 9/2007 Wakabayashi ......... B62D 7/224
 280/89

FOREIGN PATENT DOCUMENTS

JP 2007-100777 A 4/2007
TW I239375 B 5/1990

* cited by examiner

DAMPING DEVICE

TECHNICAL FIELD

The present invention relates to a damping device to be arranged between two structural bodies between which vibrational energy is transmitted, which is configured to attenuate the vibrational energy that is transmitted from one of the structural bodies, which is a vibration source, to another of the structural bodies.

BACKGROUND ART

As the damping device of this type, there is known one disclosed in JP 10-184757 A. This damping device is a device provided as a brace between poles of building structures. Specifically, the damping device includes a rod member coupled to one structural body, and a housing member provided to cover the rod member and fixed to another structural body. The rod member has an outer peripheral surface provided with a helical thread groove, and a nut member that is freely rotatable with respect to the housing member is threadedly engaged with the thread groove. Further, a cylindrical rotor housed within the housing member is fixed in the nut member, and the rotor has an outer spherical surface facing an inner peripheral surface of the housing member so as to form a containing chamber for viscous fluid.

In the damping device structured as described above, when the rod member advances and retreats in an axial direction with respect to the nut member along with vibration applied between the two structural bodies, the nut member converts an axial motion of the rod member into a rotational motion, and the rotor fixed in the nut member is also rotated along with the rotational motion of the nut member. At this time, a gap between the outer peripheral surface of the rotor and the inner peripheral surface of the housing member is formed as the containing chamber for the viscous fluid. Thus, when the rotor is rotated, a shear friction force in proportion to a rotational angular speed of the rotor is applied to the viscous fluid in the accommodation chamber. As a result, heat is generated in the viscous fluid. In other words, in this damping device, vibrational energy between the structural bodies is converted into rotational energy, and further, energy of the rotational energy is converted into thermal energy. As a result, the vibrational energy transmitted between the structural bodies is attenuated.

CITATION LIST

Patent Literature

[PTL 1] JP 10-184757 A

DISCLOSURE OF THE INVENTION

Problem to be Solved by the Invention

In the damping device of this type, a damping force is generated in proportion to a surface area of the rotor exposed to the viscous fluid, and hence the damping force cannot be increased unless an axial length of the rotor is set to be longer. Thus, an entire length of the damping device is increased irrespectively of an entire length of the rod or a stroke amount, and hence the damping device is disadvantageously increased in size in accordance therewith.

Means for Solving the Problems

The present invention has been made in view of such a problem, and it is an object thereof to provide a damping device that is smaller in size and capable of effectively attenuating vibrational energy that is propagated between two structural bodies.

In order to achieve the above-mentioned object, according to one embodiment of the present invention, there is provided a damping device, including: a fixed cylinder that is configured to be fixed to a first structural body and formed into a cylindrical shape so as to comprise a hollow portion; a shaft member that is configured to be fixed to a second structural body, the shaft member being housed in the hollow portion of the fixed cylinder and having an outer peripheral surface provided with a helical thread groove; a nut member that is threadedly engaged with the shaft member, and converts an axial motion of the shaft member into a rotational motion; a rotor member that is formed into a cylindrical shape so as to cover the fixed cylinder and to form a cylindrical accommodation chamber between the rotor member and an outer peripheral surface of the fixed cylinder, and is rotated by the nut member; and viscous fluid that is sealed in the cylindrical accommodation chamber.

Effects of the Invention

In such a damping device of the present invention, the rotor member that is rotated together with the nut member is formed into the cylindrical shape so as to cover the fixed cylinder, and is located on a radially outside of the accommodation chamber for the viscous fluid. Thus, an inertia moment of the rotor member can be set to be larger than that in a related-art damping device in which a rotor is arranged on a radially inside of the accommodation chamber for the viscous fluid when the damping device of the present invention and the related-art damping device have the same outer diameter. Further, a thickness of the rotor member arranged to cover the fixed cylinder can be freely set, and hence the inertia moment can be further increased in proportion to increase in mass.

Thus, the rotor member functions like a flywheel, specifically, operates to hinder acceleration and deceleration of a rotational motion of the nut member, which is caused by vibration of the structural body, and absorbs a part of the vibrational energy of the structural body through conversion into energy of a rotational motion of the rotor member itself. With this, amplitude of the vibration can be reduced, to thereby suppress vibration to be applied to the structural body.

Further, the viscous fluid acts directly on rotation of the rotor member caused by the vibration of the structural body so as to attenuate not only the vibrational energy of the structural body, but also motional energy of the rotor member that functions like a flywheel.

In other words, in the present invention, a vibration control effect obtained by an inertia moment of the rotor member and a vibration damping effect obtained by the viscous fluid are synergistically exerted, and hence the vibrational energy can be more effectively attenuated.

MODE FOR CARRYING OUT THE INVENTION

In the following, with reference to the attached drawings, detailed description is made of a damping device of the present invention.

Figure 1:
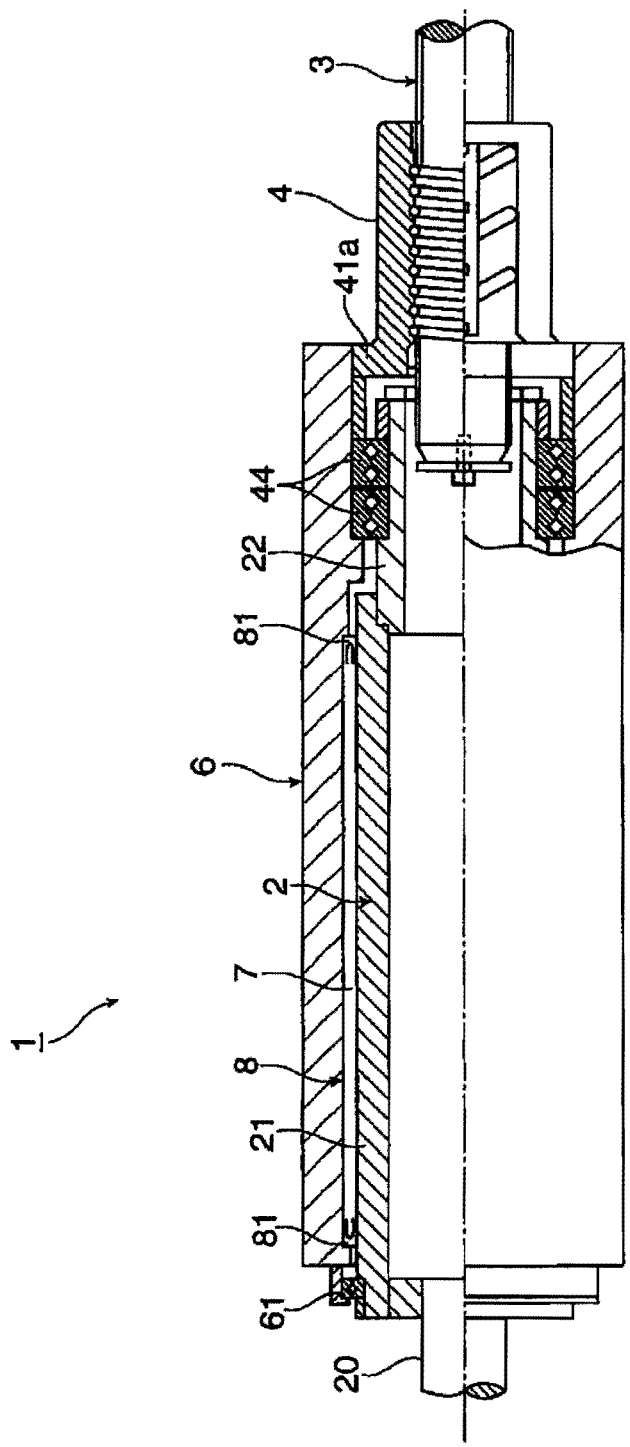
FIG. 1 is a front half-sectional view of a damping device according to a first embodiment of the present invention.

FIG. 1 is a half sectional view of a damping device according to a first embodiment of the present invention. This damping device 1 includes a fixed cylinder 2 formed into a cylindrical shape so as to include a hollow portion and an opening portion at one end, a threaded shaft 3 that is arranged by being inserted into the hollow portion of the fixed cylinder 2 through the opening end of the fixed cylinder 2 and serves as a shaft member, a nut member 4 threadedly engaged with the threaded shaft 3 through intermediation of a large number of balls 5, and a rotor member 6 coupled to the nut member 4 and supported to be freely rotatable with respect to the fixed cylinder 2. This damping device is used to damp vibration that is propagated, for example, between a building and a foundation thereof. The fixed cylinder 2 is fixed to the building as a first structural body through intermediation of a connecting rod 20, and one end of the threaded shaft 3 is fixed to the foundation as a second structural body.

The fixed cylinder 2 includes a fixing sleeve 21 that forms an accommodation chamber for viscous fluid cooperatively with the rotor member 6, and a bearing bracket 22 formed into a cylindrical shape and fixed coaxially with respect to one end in an axial direction of the fixing sleeve 21. The connecting rod 20 is coupled to the fixing sleeve 21 at an end portion on an opposite side with respect to the bearing bracket 22.

The rotor member 6 is supported to be freely rotatable with respect to the fixed cylinder 2 by rotation bearings 44 fitted to an outer peripheral surface of the bearing bracket 22, and by a rotation bearing 61 arranged at the one end of the fixing sleeve 21, which is on the opposite side with respect to the bearing bracket. A cross roller bearing is used as the rotation bearing 61, and a double-row roller bearing capable of supporting a load higher than a load that can be supported by the cross roller bearing is used as the rotation bearings 44 that is close to the nut member 4. In this way, a radial load and a thrust load that are applied from the nut member 4 to the rotor member 6 can be sufficiently supported.

Figure 2:
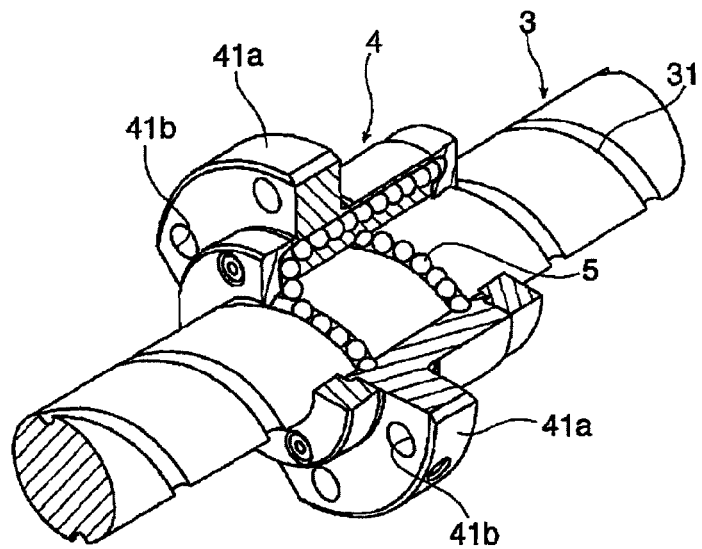
FIG. 2 is a perspective view illustrating an example of a combination of a threaded shaft and a nut member.

Meanwhile, at an end portion of the rotor member 6, the nut member 4 is fixed adjacently to the rotation bearings 44. FIG. 2 is a perspective view illustrating an example of a combination of the nut member 4 and the threaded shaft 3. The threaded shaft 3 has an outer peripheral surface provided with a helical ball rolling groove 31, and the nut member 4 is threadedly engaged with the threaded shaft 3 through intermediation of the large number of balls 5 that roll in the ball rolling groove 31. The nut member 4 is formed into a substantially cylindrical shape so as to have a through-hole through which the threaded shaft 3 is passed, and the through-hole has an inner peripheral surface provided with a helical ball rolling groove that faces the ball rolling groove 31 of the threaded shaft 3. Further, the nut member 4 has an endless circulation path for the balls 5. Endless circulation of the balls 5 enables the nut member 4 to helically move about the threaded shaft 3. In other words, those threaded shaft 3 and nut member 4 serve as a ball screw device. Further, the nut member 4 has an outer peripheral surface provided with a flange portion 41a, and the flange portion 41a is provided with bolt holes 41b for allowing fixing bolts to pass therethrough. The nut member 4 is coupled to the rotor member 6 by being fastened with the fixing bolts.

In this way, the nut member 4 is threadedly engaged with the threaded shaft 3, and in addition, the end portion of the threaded shaft 3 is fixed to the structural body such as the foundation and the building. Thus, when the threaded shaft 3 is moved in the axial direction by vibration of such structural bodies, a translational motion of the threaded shaft 3 is converted into a rotational motion of the nut member 4. With this, the rotor member 6 coupled to the nut member 4 is rotated about the fixed cylinder 2.

Meanwhile, the rotor member 6 is formed into a cylindrical shape, and has an inner peripheral surface that faces an outer peripheral surface of the fixing sleeve 21. With this, an accommodation chamber 8 for viscous fluid 7 is formed therebetween. Examples of the viscous fluid 7 filling this accommodation chamber 8 include silicone oil. Further, ring-shaped sealing members 81 are fitted to both ends in the axial direction of the accommodation chamber 8 so as to prevent the viscous fluid 7 sealed in the accommodation chamber 8 from leaking out through gaps between the fixing sleeve 21 and the rotor member 6.

In the damping device 1 according to this embodiment, which is structured as described above, when vibration along the axial direction of the threaded shaft 3 is applied to between the fixed cylinder 2 and the threaded shaft 3, energy of the vibration causes the threaded shaft 3 to repeatedly advance and retreat in the axial direction. Along therewith, the nut member 4 threadedly engaged with the threaded shaft 3 is rotated about the threaded shaft 3 while being repeatedly reversed.

In this state, along with rotation of the rotor member 6 about the fixed cylinder 2, a shear friction force is applied to the viscous fluid 7 sealed in the accommodation chamber 8. With this, rotational energy of the rotor member 6 is consumed by being converted into thermal energy of the viscous fluid 7. As a result, energy of the vibration that is propagated between the first structural body and the second structural body is attenuated.

Further, the rotor member 6 is arranged not on an inside of the fixed cylinder 2 but on an outside thereof. Thus, an inertia moment of the rotor member can be set larger than that in a related-art damping device in which the rotor member is arranged on the inside of the fixed cylinder when the damping device of the present invention and the related-art damping device have substantially the same outer diameter. In addition, a thickness of the rotor member 6 arranged to cover the fixed cylinder 2 can be freely set, and hence the inertia moment can be further increased in proportion to increase in mass.

Figure 3:
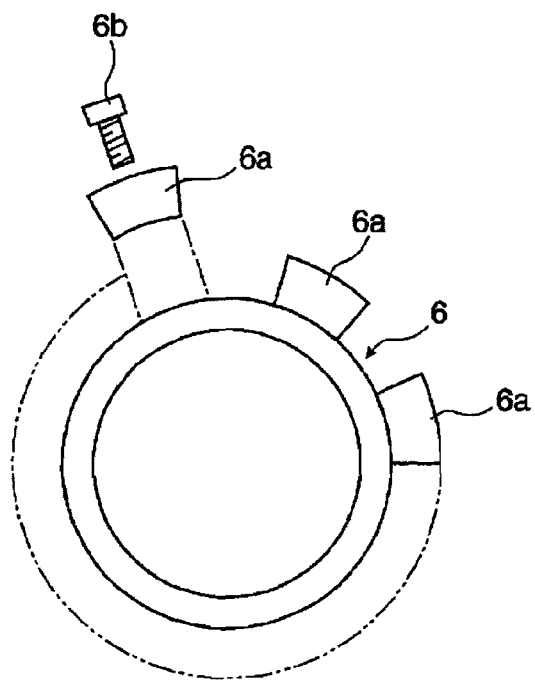
FIG. 3 is a side view of a structure for adjusting an inertia moment of a rotor member.

FIG. 3 illustrates an example of a structure of the rotor member 6, for freely increasing and reducing a magnitude of the inertia moment of the rotor member 6. FIG. 3 illustrates a state in which the rotor member 6 is viewed in the axial direction. In this structure, with respect to an outer peripheral surface of the rotor member 6 formed into a cylindrical shape, bar-like members 6a that provide additional mass and extend in the axial direction of the rotor member 6 can be fixed with bolts 6b. The bar-like members 6a can be fixed to a plurality of equiangular positions on the outer peripheral surface of the rotor member 6. When the plurality of bar-like members 6a having the same mass are evenly fixed to the outer peripheral surface of the rotor member 6, the inertia moment of the rotor member 6 can be increased while smooth rotation of the rotor member 6 is maintained. Further, the mass of the bar-like members 6a is arbitrarily changed, and thus a magnitude of the inertia moment of the rotor member 6 can be arbitrarily set.

Thus, the rotor member 6 functions like a flywheel, specifically, operates to constantly hinder acceleration and deceleration in the axial direction of the threaded shaft 3 while converting a part of the vibrational energy between the structural bodies into energy of a rotational motion of the rotor member 6 itself. With this, amplitude of the vibration can be reduced, to thereby suppress vibration of the second structural body with respect to the first structural body. Further, the viscous fluid 7 sealed in the accommodation chamber 8 contributes also to attenuation of the energy of the rotational motion, which is stored in the rotor member 6 as the flywheel.

In other words, according to the damping device of the first embodiment, a damping effect obtained by the viscous fluid sealed in the accommodation chamber and a vibration control effect obtained by the inertia moment of the rotor member are synergistically exerted, and hence the vibrational energy can be more effectively attenuated. Thus, according to the damping device of the present invention, in comparison with the related-art damping device that depends only on the damping effect obtained by the viscous fluid, a length in the axial direction of the rotor member can be reduced. As a result, the device can be downsized as a whole. Further, relatively high damping capability can be obtained in a size equivalent to that of the related damping device.

Next, description is made of a damping device according to a second embodiment of the present invention.

Figure 4:
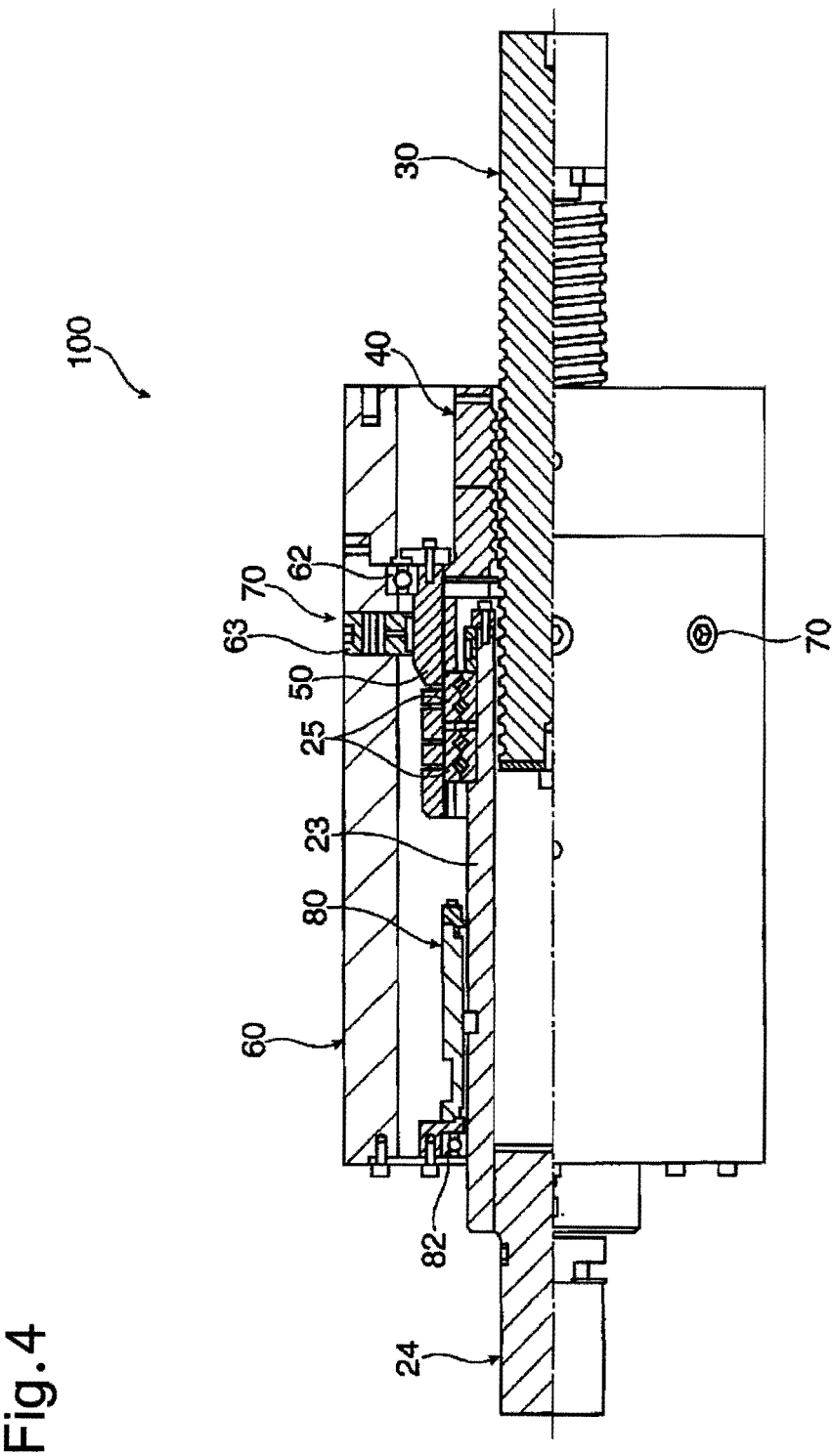
FIG. 4 is a front half-sectional view of a damping device according to a second embodiment of the present invention.

FIG. 4 illustrates the damping device according to the second embodiment of the present invention. In the first embodiment described above, the rotor member 6 itself, which forms the accommodation chamber 8 for the viscous fluid 7 cooperatively with the fixed cylinder 2, functions like a flywheel. Meanwhile, in the second embodiment, a flywheel is provided separately from the rotor member, and the rotational motion of the nut member, which is caused along with the translational motion in the axial direction of the threaded shaft, is transmitted to both the flywheel and the rotor member.

The damping device according to the second embodiment includes a fixed cylinder 23 formed into a cylindrical shape including a hollow portion, a threaded shaft 30 inserted in the hollow portion of the fixed cylinder 23, a nut member 40 threadedly engaged with the threaded shaft 30 through intermediation of a large number of balls, a cylindrical bearing housing 50 supported to be freely rotatable with respect to the fixed cylinder 23 and coupled to the nut member 40, a flywheel 60 supported to be freely rotatable with respect to the bearing housing 50, transmission limiting means 70 for transmitting a torque between the bearing housing 50 and the flywheel 60 and limiting an upper limit of the transmitted torque, and a rotor member 80 supported to be freely rotatable with respect to the fixed cylinder 23 and coupled to the flywheel 60.

The fixed cylinder 23 has one end coupled to a connecting rod 24 so as to close the hollow portion. For example, the fixed cylinder 23 is fixed to a building as a first structural body through intermediation of the connecting rod 24, and one end of the threaded shaft 30 is fixed to a foundation as a second structural body.

The fixed cylinder 23 has another end portion to which a shaft end of the threaded shaft 30 is inserted. This part functions as a bearing bracket, and has an outer peripheral surface to which inner races of a pair of double-row roller bearings 25 are fitted. Further, outer races of the double-row roller bearings 25 are fitted to an inner peripheral surface of the bearing housing 50, and the bearing housing 50 is supported by the fixed cylinder 23 through intermediation of the pair of double-row roller bearings 25. The bearing housing 50 has axial one end to which the nut member 40 is fixed so that the bearing housing 50 is rotated together with the nut member 40 about the fixed cylinder 23 along with rotation of the nut member 40.

As the threaded shaft 30 and the nut member 40, equivalents that are described above in the first embodiment with reference to FIG. 2 may be used as they are. As in the first embodiment, the shaft end of the threaded shaft 30 is fixed to the foundation as the second structural body. Thus, the nut member 40 is rotated about the threaded shaft 30 along with the translational motion in the axial direction of the threaded shaft 30, and this rotation is transmitted to the bearing housing 50.

The cylindrical flywheel 60 is provided on an outside of the bearing housing 50. The flywheel 60 is supported by the bearing housing 50 through intermediation of a ball bearing 62 so as to be freely rotatable with respect to the bearing housing 50. Further, the bearing housing 50 can be freely rotated with respect to the fixed cylinder 23, and hence the flywheel 60 can be freely rotated also with respect to the fixed cylinder 23.

Figure 5:
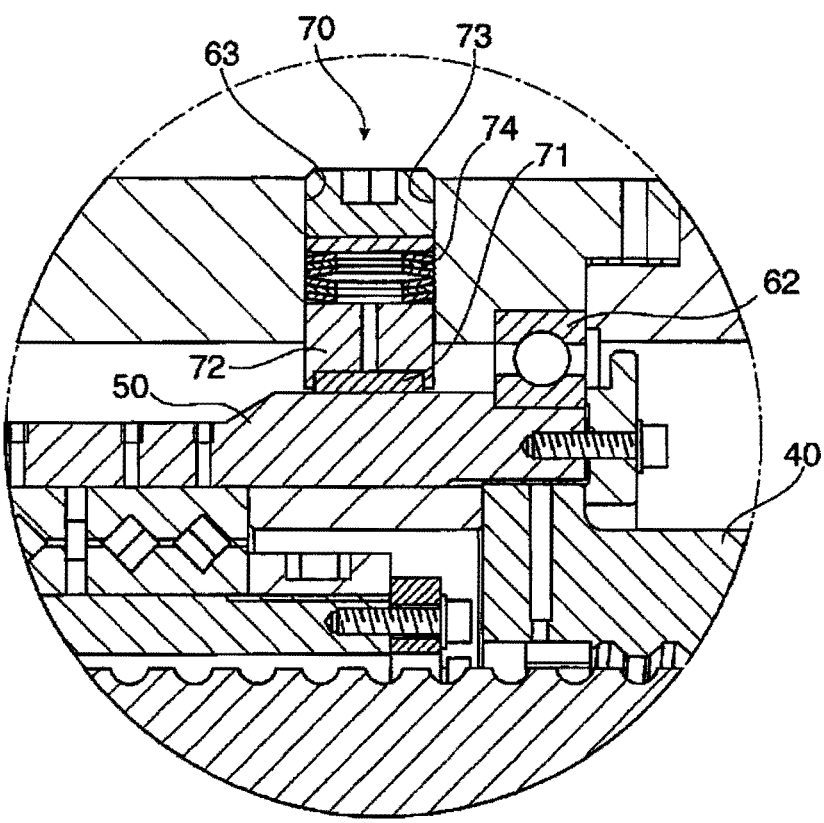
FIG. 5 is an enlarged view of a structure of transmission limiting means of the damping device illustrated in FIG. 4.

The above-mentioned transmission limiting means 70 is provided between the bearing housing 50 and the flywheel 60 so that the flywheel 60 is rotated along with rotation of the bearing housing 50. FIG. 5 illustrates details of the transmission limiting means 70. This transmission limiting means 70 includes a circular regulating belt 71 fixed by bonding circumferentially around an outer peripheral surface of the bearing housing 50, a pressing pad 72 inserted in an adjustment hole 63 formed through the flywheel 60 and held in sliding contact with the regulating belt 71, an adjustment screw 73 threadedly engaged with the adjustment hole 63 from an outer peripheral surface side of the flywheel 60, and a pad urging member 74 arranged between the pressing pad 72 and the adjustment screw 73.

A plurality of the adjustment holes 63 are provided along a circumferential direction of the flywheel 60, and the pressing pad 72 is arranged in each of the adjustment holes 63. Therefore, a plurality of the pressing pads 72 are held in contact with the regulating belt 71. Further, the pad urging member 74 includes a plurality of laminated disk springs that are inserted in each of the adjustment holes 63, and may include other types of elastic members such as a coil spring and a rubber piece as long as the pressing pad 72 can be urged along with fastening of the adjustment screw 73.

In the transmission limiting means 70 structured as described above, when the adjustment screw 73 is fastened, the pad urging member 74 is compressed in accordance with a fastening degree thereof. Further, the pad urging member 74 thus compressed urges the pressing pad 72 to a radially inside of the flywheel 60, with the result that the pressing pad 72 is held in press-contact with the regulating belt 71 fixed to the bearing housing 50. Thus, a frictional force to be applied between the pressing pad 72 and the regulating belt 71 is adjusted in accordance with the fastening degree of the adjustment screw 73. The frictional force is increased when the fastening degree of the adjustment screw 73 is increased, and hence a high torque can be transmitted between the bearing housing 50 and the flywheel 60. In contrast, the frictional force to be applied between the pressing pad 72 and the regulating belt 71 is reduced when the fastening degree of the adjustment screw 73 is decreased. With this, the torque that can be transmitted between the bearing housing 50 and the flywheel 60 is reduced.

In other words, through adjustment of the fastening degree of the adjustment screw 73, a degree of the torque that can be transmitted between the bearing housing 50 and the flywheel 60 can be arbitrarily adjusted. Even when a torque that is applied to the bearing housing 50 or the flywheel 60 exceeds the torque that can be transmitted therebetween, the pressing pads 72 slide on the regulating belt 71. As a result, only when being commensurate with the frictional force that is applied between the pressing pads 72 and the regulating belt 71, the torque is transmitted from the flywheel 60 to the bearing housing 50, or from the bearing housing 50 to the flywheel 60.

Meanwhile, around the fixed cylinder 23, the rotor member 80 is provided adjacently in the axial direction to the bearing housing 50. The rotor member 80 is supported by an outer peripheral surface of the fixed cylinder 23 through intermediation of a rotation bearing 82, and coupled to the flywheel 60 so as to rotate about the fixed cylinder 23 in conjunction with the flywheel 60. As in the first embodiment described above, an inner peripheral surface of the rotor member 80 faces the outer peripheral surface of the fixed cylinder 23 so as to form an accommodation chamber for viscous fluid. Along with rotation of the rotor member 80, a shear friction force is applied to the viscous fluid filled in the accommodation chamber. With this, energy of a rotational motion of the rotor member 80 is attenuated, resulting in attenuation of energy of a rotational motion of the flywheel 60.

In the damping device according to the second embodiment, which is structured as described above, the threaded shaft 30 advances and retreats in the axial direction along with vibration applied between the first structural body and the second structural body. Along therewith, the nut member 40, which is threadedly engaged with the threaded shaft 30, is rotated about the threaded shaft 30, and this rotation is transmitted to the bearing housing 50. When the adjustment screws 73 are fastened with a sufficiently high degree in the transmission limiting means 70 and the pressing pads 72 do not slip with respect to the regulating belt 71, the rotation of the nut member 40 is transmitted to the flywheel 60 through intermediation of the bearing housing 50, and this rotation is further transmitted to the rotor member 80.

In this way, as in the first embodiment described above, the shear friction force is applied to the viscous fluid sealed in the accommodation chamber along with the rotation of the rotor member 80, and the energy of the rotational motion the rotor member 80 is consumed by being converted into thermal energy of the viscous fluid. As a result, energy of the vibration that is propagated between the first structural body and the second structural body is attenuated.

Further, in the second embodiment, the flywheel 60 is provided separately from the rotor member 80 on a radially outside of the rotor member 80 so that an inertia moment of the flywheel 60 can be set to an arbitrary degree. Along with a reciprocating motion in the axial direction of the threaded shaft 30, the flywheel 60 accelerates and decelerates while being repeatedly reversed. With this, the flywheel 60 operates to constantly hinder acceleration and deceleration in the axial direction of the threaded shaft 30 while converting a part of the vibrational energy between the structural bodies into the energy of the rotational motion of the flywheel 60 itself. In this way, vibration of the second structural body with respect to the first structural body can be suppressed. Further, the flywheel 60 and the rotor member 80 are coupled in series to each other, and hence the energy of the rotational motion, which is stored in the flywheel 60, is attenuated by action of the viscous fluid.

In other words, also in the damping device according to the second embodiment, the damping effect obtained by the viscous fluid and the vibration control effect obtained by the inertia moment of the flywheel 60 are synergistically exerted, and hence the vibrational energy can be more effectively attenuated. In addition, mass and a size of the flywheel 60 can be arbitrarily set, and hence the damping effect can be arbitrarily set as well.

Here, the flywheel 60 stores angular momentum along with the rotation of the flywheel 60 itself. Thus, when the nut member 40 and the bearing housing 50 are each to decelerate past a center of a reverse motion, a torque corresponding to the angular momentum of the flywheel 60 is applied from the flywheel 60 to the bearing housing 50 and the nut member 40. In order to convert the vibrational energy more into the energy of the rotational motion of the flywheel 60, it is effective to set the inertia moment of the flywheel 60 to be large. However, the angular momentum that is stored in the flywheel 60 becomes higher in proportion to increase in the inertia moment, and hence the torque that is applied from the flywheel 60 to the bearing housing 50 and the nut member 40 at the time of deceleration of those members becomes higher.

Meanwhile, a rotational motion of the nut member 40 is restricted by the reciprocating motion in the axial direction of the threaded shaft 30. Thus, when the high torque for directly rotating the nut member 40 is applied thereto from the flywheel 60 at the time of the deceleration of the nut member 40 in conjunction with the motion of the threaded shaft 30, the large number of balls arrayed between the nut member 40 and the threaded shaft 30 are excessively compressed, which may cause damage on the threaded shaft 30, the nut member 40, and the balls.

In such a case, the transmission limiting means 70 exerts a function of allowing the pressing pads 72 to slip with respect to the regulating belt 71 so as to release the rotations of the bearing housing 50 and the nut member 40 from the rotation of the flywheel 60. In other words, the fastening degree of the adjustment screw 73 of the transmission limiting means 70 is determined such that the transmission limiting means 70 releases the rotation of the bearing housing 50 from the rotation of the flywheel 60 in a case where the torque that is applied from the flywheel 60 to the bearing housing 50 becomes equal to or higher than a maximum torque that can be supported by the nut member 40, which is calculated based on a relationship to an axial permissible load of the nut member 40. When the fastening degree of the adjustment screw 73 is determined in this way, an excessively high torque is prevented from being applied to the nut member 40. This is specifically because, at the time of deceleration of the rotation of the nut member 40, when the torque, which is applied from the flywheel 60 to the bearing housing 50 and the nut member 40 so as to continue the rotation, exceeds the maximum torque that can be supported by the nut member 40, the flywheel 60 and the rotor member 80 coupled in series thereto continue to be rotated irrespectively of the deceleration of the bearing housing 50.

Further, in the damping device 100 according to this embodiment, the rotor member 80 is coupled not to the bearing housing 50 that is coupled to the nut member 40, but to the flywheel 60. Thus, when the rotation of the flywheel 60 is released from the rotation of the nut member 40 as described above, the rotor member 80 is rotated together with the flywheel 60 irrespectively of the rotation of the nut member 40. As a result, after the rotation of the flywheel 60 is released from the rotation of the nut member 40, the damping effect of the viscous fluid described above is exerted not on the rotation of the nut member 40, but on the rotation of the flywheel 60. In this way, the angular momentum of the flywheel 60 is damped.

On a premise that the rotor member 80 is coupled not to the flywheel 60 but to the bearing housing 50 and the nut member 40, there is no means for actively damping the angular momentum of the flywheel 60 after the rotation of the flywheel 60 is released from the rotation of the nut member 40. Thus, the flywheel 60 continues to be rotated while storing the angular moment. In this case, a long time period is required until the flywheel 60 is re-coupled to the nut member 40, and vibration that is applied to the threaded shaft 30 needs to be damped only by the damping effect of the viscous fluid until the re-coupling. In this case, an advantage of provision of the flywheel 60 having a large inertia moment is lost.

In contrast, when the rotor member 80 is configured to rotate constantly together with the flywheel 60, the viscous fluid functions to damp the angular momentum of the flywheel 60 in the case where the rotation of the flywheel 60 is released from the rotation of the nut member 40. Thus, slippage between the regulating belt 71 and the pressing pads 72 is immediately stopped in the transmission limiting means 70, and the flywheel 60 and the bearing housing 50 are rotated together again. As a result, the flywheel 60 and the viscous fluid contribute again to damping of the rotational motion of the nut member 40, resulting in the attenuation of the energy of the vibration that is propagated between the first structural body and the second structural body.

In other words, in the damping device 100 according to the second embodiment, the inertia moment of the flywheel 60 is set to be large so as to effectively attenuate the vibrational energy. In addition, when the torque that is applied from the flywheel 60 having the large inertia moment to the nut member 40 is excessively high, the flywheel 60 is disengaged from the nut member 40 so as to prevent damage on the damping device 100.

Further, even when the flywheel 60 is disengaged from the nut member 40 so as to prevent the damage on the damping device 100, the angular momentum of the flywheel 60 is immediately reduced so as to quickly re-couple the flywheel 60 and the nut member 40 to each other. Thus, the damping effects of the flywheel 60 and the viscous fluid can be effectively exerted on vibration in the axial direction of the threaded shaft 30.

The invention claimed is:

1. A damping device, comprising:
    a fixed cylinder that is configured to be fixed to a first structural body and formed into a cylindrical shape so as to comprise a hollow portion;
    a shaft member that is configured to be fixed to a second structural body, the shaft member being housed in the hollow portion of the fixed cylinder and having an outer peripheral surface provided with a helical thread groove;
    a nut member that is threadedly engaged with the shaft member, and converts an axial motion of the shaft member into a rotational motion;
    a rotor member that is formed into a cylindrical shape so as to cover the fixed cylinder and to form a cylindrical accommodation chamber between the rotor member and an outer peripheral surface of the fixed cylinder, and is rotated by the nut member;
    viscous fluid that is sealed in the cylindrical accommodation chamber; and
    wherein said damping device is free of viscous fluid radially outside of said rotor member.

2. The damping device according to claim 1, further comprising a flywheel having a cylindrical shape arranged on a radially outside of the nut member and the rotor member,
    wherein the flywheel is coupled to the nut member.

3. The damping device according to claim 2, further comprising a transmission limiter that limits an upper limit value of a torque that is transmittable between the flywheel and the nut member,
    wherein the flywheel is coupled to the nut member through intermediation of the transmission limiter.

4. The damping device according to claim 3, wherein rotation of the nut member is transmitted to the rotor member through intermediation of the transmission limiter and the flywheel.

5. The damping device according to claim 1, wherein said rotor member is weighted sufficiently to function as a flywheel that hinders acceleration and deceleration of rotational motion of the nut member.

6. The damping device according to claim 5, wherein a weight of said rotor member is selectively adjustable to vary an inertial moment of said rotor member.

7. The damping device according to claim 6, wherein said weight of said rotor member is selectively adjustable by varying a thickness of said rotor member.

* * * * *

UNITED STATES PATENT AND TRADEMARK OFFICE
CERTIFICATE OF CORRECTION

PATENT NO.         : 9,494,208 B2
APPLICATION NO.    : 14/347198
DATED              : November 15, 2016
INVENTOR(S)        : Yoshihito Watanabe et al.

It is certified that error appears in the above-identified patent and that said Letters Patent is hereby corrected as shown below:

On the Title Page

Item (73):
Change:
(73) Assignees: THK CO., LTD., Shinagawa-ku (JP)

To be:
(73) Assignees: THK CO., LTD., Shinagawa-ku (JP)
                -- ASEISMIC DEVICES CO., LTD., Chiyoda-ku --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*